3,091,287
APPARATUS FOR EQUIPPING TRANSPORT VEHICLES WITH TEMPORARY DOOR CLOSURES
Francis E. Willoughby, Potter, Nebr., assignor to Willoughby Manufacturing Company, Potter, Nebr., a corporation of Nebraska
Filed Aug. 12, 1959, Ser. No. 833,358
2 Claims. (Cl. 160—368)

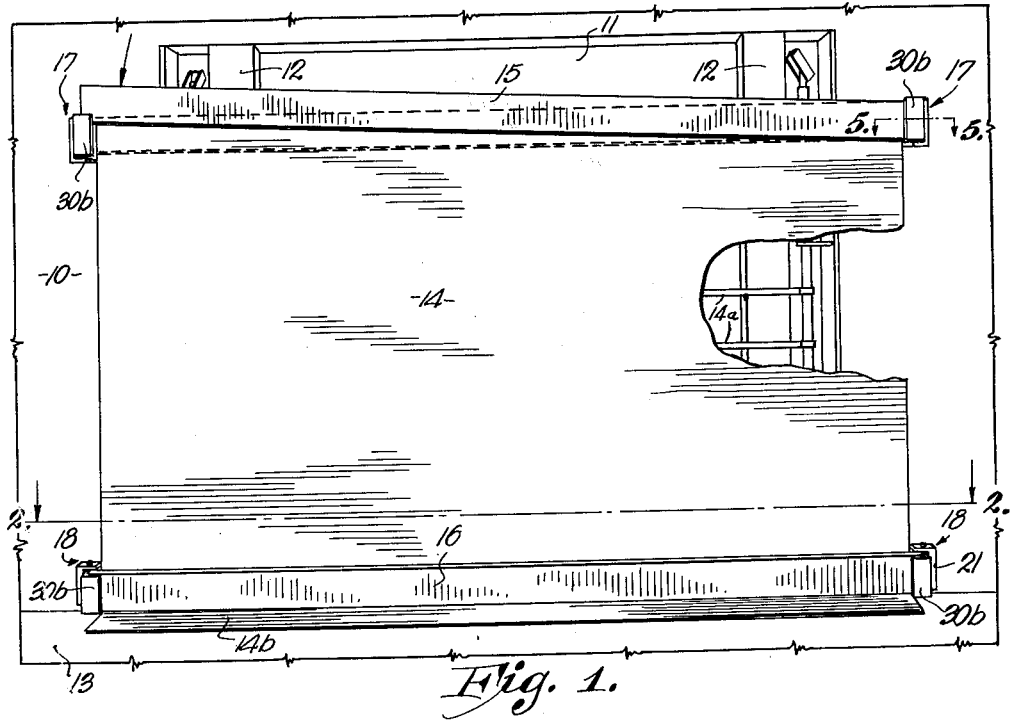
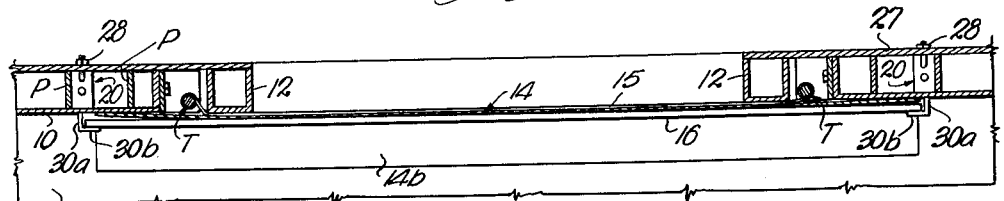
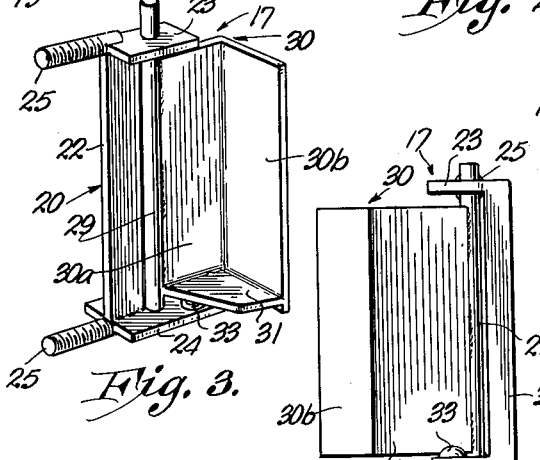
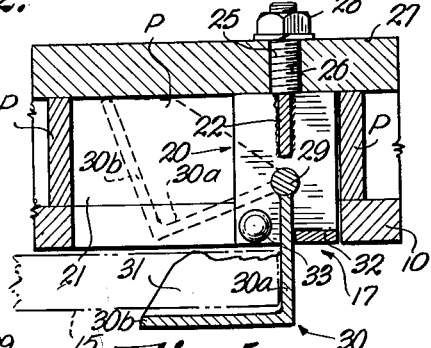
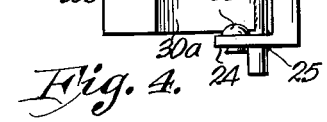

This invention relates primarily to the installation and retention of temporary closures in railway or like vehicles of the type employed for transporting pulverulent materials, and refers more particularly to means for accomplishing this without requiring the use of nails or other fasteners.

In my co-pending application Serial No. 792,164, filed February 9, 1959, now Patent No. 3,029,869, issued April 17, 1962, I have disclosed apparatus for mounting and tightening temporary closures, such as paper grain doors, in transport vehicles without requiring the use of nails. The advantages of such an arrangement are set forth in detail in that application and will not be repeated here.

In many cases it is desirable, and sometimes required, that the paper door be further reinforced near the upper and lower edges by retaining bars or boards which span the doorway on the inside of the car. Heretofore, these bars or boards have been secured in place by nailing them to the vehicle wall or to special nailing posts. Brackets capable of receiving the retaining bars have been proposed in the past but have met with little acceptance, mainly because of the objection that they project from the inside wall and may interfere with the use of the vehicle for other purposes. In addition, they present dangerous projections which may be accidentally engaged by men who are working in the car.

An object of the present invention is to provide a vehicle construction in which suitable means for holding and retaining the bars or boards across the door opening is provided, which means is capable of operation and use without requiring nails or other fasteners, and when not in use, can be retracted into the wall structure of the vehicle.

A further object of the invention is to provide a vehicle construction of the character described, in which the holding and retaining means are so constructed that they can be releasably maintained in either the projecting, bar receiving position or the retracted position, as the situation may require. A feature of the invention resides in the structure by which this purpose is achieved.

Another object of the invention is to provide a vehicle construction of the character described in which the objects of strength, retractibility and convenience in use are achieved at low cost.

A further object of the invention is to provide a bar retaining and holding structure which is capable of installation in existing transport vehicles without requiring extensive remodification of the vehicle, and which, when installed, provides the converted vehicle with the advantages hereinbefore set forth.

Other and further objects of the invention together with the features of novelty appurtenant thereto will appear during the course of the following description.

In the accompanying drawings which form a part of the specification and are to be read in conjunction therewith, and in which like reference numerals indicate like parts in the various views:

FIG. 1 is a fragmentary perspective view taken from the inside of a typical railway car embodying the invention looking toward a door opening and showing the retaining bars as they appear near the final stages of installation;

FIG. 2 is a sectional view taken generally along the line 2—2 of FIG. 1 in the direction of the arrows;

FIG. 3 is a perspective view on an enlarged scale of a typical upper bracket assembly disassociated from the vehicle, showing the bar holding member in the outwardly projecting position;

FIG. 4 is an elevational view of the bracket assembly of FIG. 3 and illustrates the assembly as it would appear to the observer when looking into the recess and when the holding member is retracted therein;

FIG. 5 is an enlarged fragmentary section taken along the line 5—5 of FIG. 1 in the direction of the arrows, the broken lines indicating the retracted position for the holding member.

Referring now to the drawings and initially to FIGS. 1 and 2, in FIG. 1 I have shown a portion of the inside of a typical railway car having the inside wall surface or sheathing 10 interrupted by a door opening 11. The sides of the door opening are defined by the vertical door jambs 12. It will be understood that the car is equipped with the usual outside doors (not shown). The floor of the car is illustrated generally at 13.

Disposed across the door opening 11 is a typical strap reinforced paper grain door 14. As will be observed, the paper of the door is reinforced by the horizontal straps 14a. These straps are separated from the paper near the ends of the latter and are wound upon tightening assemblies on either side of the door, the tightening assemblies being generally indicated by the letter T. The details of the tightening assemblies form no part of the present invention, but further information as to their manner of construction and operation may be obtained from my co-pending application referred to earlier herein.

It will be observed that beyond the tightening assemblies T the end portions of the paper door are flat against the inside wall of the car. There is also at the base of the paper door an inturned flap 14b which rests upon the floor.

To assist in retaining the door in position and provide an adequate seal against accidental escape of grain or other material, there are provided at the upper and lower edges thereof the horizontally disposed retaining bars 15 and 16, respectively. My invention has to do with the manner of securing these bars in place while in use.

As will be observed from the drawing, it is usual to so mount the retaining bars 15 and 16 that they are positioned near the upper and lower extremities of the paper door. The bars may conveniently be 1 x 6 planks or boards which have sufficient length as to extend past the ends of the doors.

In my invention the upper bar 15 is held by a pair of upper bracket assemblies 17, and the lower bar 16 by a similar pair of bracket assemblies 18. For the purposes of convenience in description, the bracket assemblies on the left side of the door opening as viewed in FIGS. 1 and 2 will be referred to as the left hand bracket assemblies and those on the right as the right hand bracket assemblies. The only difference between the upper left hand and upper right hand bracket assemblies is that one is the mirror image of the other, and the same is true as to the respective assemblies of the lower pair. Consequently, the description will be limited to one of each pair.

The upper right hand bracket assembly is shown in detail in FIGS. 3, 4, and 5. Reference numeral 20 indicates generally a base member which is adapted to be mounted in a recess 21 formed in the wall structure of the car. (FIGS. 1 and 5). The recess is preferably rectangular and provides a relatively deep pocket in which the base member can be mounted. It should be lined, as by filler partition P, for example, to prevent grain or other material from leaking into the wall structure. The base member includes an upright plate member 22 having secured to its upper and lower ends parallel journal plates 23 and 24. Threaded studs 25 project from the upper and lower ends of member 22. When assembled with the vehicle, as shown in FIG. 5, these studs extend through the corresponding apertures 26 formed in the outside sheathing 27 of the vehicle and are secured in place by nuts 28.

Extending between the journal plates 23 and 24, and having end portions loosely received and extending through aligned apertures in the journal plates, is a shaft or pin 29. A bar holding member generally indicated at 30 is fixedly secured to shaft 29 and is capable of rotating therewith. Preferably the bar holding member comprises an angle structure which is L-shaped in cross section, having one leg 30a secured along the shaft 29 as by welds, and another leg 30b remote from the shaft. As shown in FIG. 5, the length of the leg 30a is such that when it is in a position in which it extends directly out of the recess (the solid line position), the other leg 30b is spaced from the wall plane a distance sufficient to permit insertion of the end of the retaining bar 15 behind leg 30b with the retaining bar parallel with and adjacent the wall plane. The leg 30b thus serves as a lip or flange designed to engage the end portion of the bar and retain it against movement away from the wall. A seat for the lower edge of the bar is provided by a gusset plate 31 secured to and extending between legs 30a and 30b, near but spaced above the lower edge thereof.

As will be evident, and as has been earlier mentioned, the extended position for the holding member 30 is illustrated in FIGS. 1 and 2 and in the solid lines of FIG. 5. The holding member is also shown in the extended position in FIG. 3. Referring particularly to FIG. 5, counter-clockwise movement of the retaining member beyond the extended position is prevented by a stationary stop member 32 which extends between and is secured to the upper and lower journal plates 23 and 24, and lies in the path of the leg 30a. The ends of the retaining bar serve to prevent movement of the holding member in the opposite direction, while the retaining bar is in place. It will be evident, therefore, that with the holding members 30 of the bracket assemblies in the extended position, the holding members provide lips or flanges adapted to receive and support the retaining bar in the cross-wise position across the door opening.

It is desirable, however, that means for retaining the holding member of each bracket assembly in the extended position prior to insertion of the retaining bar be provided. For this purpose I employ a short lug or stop 33 projecting above the upper surface of the lower journal plates 24. As is best seen in FIG. 5, this lug lies in the path of movement of the leg 30a of the holding member and will be engaged by the lower edge thereof if an attempt is made to swing the holding member toward the broken line position. The lug can be cleared by the lower edge only by raising the holding member and simultaneously swinging it inwardly. It will be noted that the vertical length of the leg 30a is enough less than the spacing of the journal plates 23 and 24 to permit the necessary upward displacement.

Once over the lug 33, the upward pressure on the holding member can be released and the holding member will again drop by gravity to a position in which its lower edge again rides on the lower plate 24. The holding member is now in the retracted position illustrated in broken lines in FIG. 5. The gusset plate 31 is spaced sufficiently above the lower edges of legs 30a and 30b as to at all times clear the lug.

Accidental return of the holding member to the extended position is resisted by the lug. Thus, at times when the bracket assemblies are not in use they are maintained in a concealed or retracted position within the wall structure and will not interfere with the use of the vehicle for other purposes. To return the holding member to its extended position it is lifted and swung outwardly until leg 30a is again on the outside of the lug which is the solid line position of FIG. 5.

The lower bracket assemblies are identical to the upper ones with the sole exception that if desired, the gusset plate 31 can be eliminated in the case of the latter. Normally it will be desirable to place the lower assemblies closely adjacent the floor and in view of this, the floor itself provides the necessary bottom support for the retaining bar.

It will be observed that the bracket assemblies are so proportioned that their stationary parts are wholly contained within the recesses; in other words, there are no projections on the inside wall of the car. While in use, the holding members are in an extended position, but they can be retracted into the recesses upon removal of the bars and doors and will remain in this position until such time as they may again be required for use.

From the foregoing it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. The combination with a transport vehicle having an inner wall surface interrupted by a door opening, of a pair of support bracket assemblies adapted to hold a retaining bar in horizontal position across said door opening and against the inside wall of the vehicle, each said bracket assembly including a base member mounted within a recess in the wall surface to one side of the opening, a retractable bar holding member including a vertically disposed outer bar holding flange, pivot means connecting said holding member with said base member on a vertical pivot axis within the recess, said axis being so located as to provide for swinging movement of said holding member between a first position in which said holding member, including said holding flange, is substantially wholly within the recess and a second position in which the holding member projects from the recess with the holding flange spaced inwardly of the plane of the wall surface thus to provide a gap between the flange and the wall plane in which a portion of the bar can be inserted, said pivot means so constructed as to permit limited displacement of said holding member in a direction parallel to the pivot axis, and a stop lug interposed in the path of pivotal movement of said holding member between said first and second positions, said lug of a length that it can be cleared by the displacement of said holding member in a direction parallel to said pivot axis.

2. In a retractable bracket assembly for supporting and retaining one end of a retaining bar disposed across the door opening of a transport vehicle and against the inside wall of the vehicle to one side of the door opening, the combination of a base member mounted within a recess in the side wall, an L-shaped holding member having the legs thereof in vertical planes with the end of one leg disposed in said recess, connecting means pivotally connecting said one leg to said base member on a vertical axis located within the recess, said axis so located that said holding member has a first position in which it is substantially wholly within the recess and a second position in which said one leg extends outwardly from said recess, said other leg of the holding member providing a bar retaining surface spaced away from the wall plane of the vehicle when said holding member is in said second position, said connecting means so constructed as to permit limited upper displacement of said holding member, and locking means for releasably retaining said holding member in said first and second positions, said locking means including a stop lug disposed in the path of the lower edge of said one leg intermediate the first and second positions, said lug having a height such that it can be cleared by lift of said holding member whereby to permit swinging of said holding member about its pivot axis without engaging the lug.

References Cited in the file of this patent
UNITED STATES PATENTS

| | | |
|---|---|---|
| 212,242 | Loper | Feb. 11, 1879 |
| 633,742 | Turner | Sept. 26, 1899 |
| 910,010 | Mockridge | Jan. 19, 1909 |
| 983,935 | Sampson | Feb. 14, 1911 |
| 1,070,580 | Breithaupt | Aug. 19, 1913 |
| 2,822,044 | Leslie | Feb. 4, 1958 |